(12) United States Patent
Johnson (10) Patent No.: US 11,834,145 B2
(45) Date of Patent: Dec. 5, 2023

(54) CAMERA STABILIZATION IN AERIAL PHOTOGRAPHY AND VIDEOGRAPHY

(71) Applicant: Samuel A Johnson, Arvada, CO (US)

(72) Inventor: Samuel A Johnson, Arvada, CO (US)

( * ) Notice: Subject to any disclaimer, the term of this patent is extended or adjusted under 35 U.S.C. 154(b) by 223 days.

(21) Appl. No.: 17/231,200

(22) Filed: Apr. 15, 2021

(65) Prior Publication Data
US 2022/0332404 A1    Oct. 20, 2022

(51) Int. Cl.
*B64B 1/52*    (2006.01)
*B64D 47/08*   (2006.01)
*G02B 27/64*   (2006.01)

(52) U.S. Cl.
CPC .............. *B64B 1/52* (2013.01); *B64D 47/08* (2013.01); *G02B 27/646* (2013.01)

(58) Field of Classification Search
CPC .... B64B 1/50; B64B 1/52; B64C 31/06; F41J 9/10
See application file for complete search history.

(56) References Cited

U.S. PATENT DOCUMENTS

| | | | |
|---|---|---|---|
| 2,398,745 A | 4/1946 | Jalbert | |
| 2,431,938 A | 12/1947 | Jalbert | |
| 3,893,123 A * | 7/1975 | Bieser | H01Q 1/18 343/765 |
| 4,020,491 A * | 4/1977 | Bieser | H01Q 1/18 74/5.22 |
| 6,016,998 A | 1/2000 | Allsopp | |
| 6,402,090 B1 * | 6/2002 | Aaron | B64B 1/00 244/31 |
| 8,544,788 B1 * | 10/2013 | Capper | G08B 13/194 244/33 |
| 8,897,933 B1 * | 11/2014 | Teller | B64B 1/00 701/16 |
| 9,010,691 B1 * | 4/2015 | Ratner | B64D 1/12 455/431 |
| 9,663,214 B2 | 5/2017 | Guetta et al. | |

(Continued)

FOREIGN PATENT DOCUMENTS

WO    2010032251 A2    3/2010

OTHER PUBLICATIONS

Allsopp Helikites Limited website, Aerial Surveillance, http://www.allsopp.co.uk/index.php?mod=page&id_pag=60, retrieved Apr. 7, 2021.

*Primary Examiner* — Benjamin P Lee
(74) *Attorney, Agent, or Firm* — MP Patents, LLC (57) ABSTRACT

A system for supporting a camera during aerial photography or videography includes a gimbal, a platform, a first flywheel, an onboard electronics module and a link rod with a longitudinal axis. The gimbal includes an inner ring external to and concentric with the link rod and coupled thereto for relative rotation about the longitudinal axis, a middle ring external to and concentric with the inner ring and coupled thereto for relative pivoting about a second axis nearly perpendicular to the longitudinal axis and an outer ring external to and concentric with the middle ring and coupled thereto for relative pivoting about a third axis perpendicular to the second axis. The platform is provided to the outer ring. The first flywheel is mounted at a first position on the platform so as to balance with a camera at a second position and an onboard electronics module at a third position.

16 Claims, 9 Drawing Sheets

(56) References Cited

U.S. PATENT DOCUMENTS

| | | | | |
|---|---|---|---|---|
| 9,696,416 B2* | 7/2017 | Blase | ............ | H01Q 3/30 |
| 9,789,960 B2* | 10/2017 | Hoheisel | ............ | H04N 23/60 |
| 10,717,510 B2* | 7/2020 | Cromie | ............ | B64B 1/40 |
| 11,352,134 B2* | 6/2022 | Heinen | ............ | H01Q 1/28 |
| 2014/0054412 A1* | 2/2014 | Guetta | ............ | B64B 1/52 |
| | | | | 244/33 |
| 2016/0207626 A1* | 7/2016 | Bailey | ............ | B64C 39/022 |
| 2018/0135798 A1* | 5/2018 | Griffin | ............ | G05B 6/02 |
| 2018/0213187 A1* | 7/2018 | Chandra | ............ | H04N 23/66 |

* cited by examiner

CAMERA STABILIZATION IN AERIAL PHOTOGRAPHY AND VIDEOGRAPHY

TECHNICAL FIELD

The disclosure pertains to photography and videography.

BACKGROUND

The necessity for obtaining high quality aerial video and photographs is compelling. Industries such as real-estate, security, inventory tracking, plant safety, insurance, civil infrastructure, police, fire, and too many others to name a few, need timely aerial reconnaissance for their mission statements.

SUMMARY

The disclosure describes a system for aerial photography or videography. The system includes a link rod, a gimbal, a platform, a camera, a first flywheel and a power source. The link rod has a longitudinal axis. The gimbal includes an inner ring external to and concentric with the link rod and coupled thereto for relative rotation about the link rod longitudinal axis, a middle ring external to and concentric with the inner ring and coupled thereto for relative pivoting about a second axis nearly perpendicular to the link rod longitudinal axis and an outer ring external to and concentric with the middle ring and coupled thereto for relative pivoting about a third axis nearly perpendicular to the second axis. The platform is provided to the outer ring. The camera is mounted at a first position on the platform. The first flywheel is mounted at a second position on the platform in balance with the camera at the first position. The power source is mounted at a third position on the platform in balance with the camera at the first position and the first flywheel at the second position.

The disclosure further describes a system for supporting a camera during aerial photography or videography. The system includes a link rod, a gimbal, a platform, a first flywheel and an onboard electronics module. The link rod has a longitudinal axis. The gimbal includes an inner ring external to and concentric with the link rod and coupled thereto for relative rotation about the link rod longitudinal axis, a middle ring external to and concentric with the inner ring and coupled thereto for relative pivoting about a second axis nearly perpendicular to the link rod longitudinal axis and an outer ring external to and concentric with the middle ring and coupled thereto for relative pivoting about a third axis nearly perpendicular to the second axis. The platform is provided to the outer ring. The first flywheel is mounted at a first position on the platform so as to balance with a camera at a second position on the platform. An onboard electronics module is mounted at a third position on the platform so as to balance with a camera at the first position and the first flywheel at the second position and being configured to control a motor operatively coupled with the first flywheel.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the disclosure and manners by which they can be implemented. Although the preferred mode of carrying out disclosed embodiments has been described, those of ordinary skill in the art would recognize that other modes for carrying out or practicing disclosed embodiments are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Known camera stabilization systems weigh many hundreds of grams even without a camera, are expensive and require mounting to a drone. Given FAA regulations as well as local, state and regional legislation, aerial photography with a drone may require a complex certification process many photographers are unable to comply with.

Embodiments of the disclosure provide a low cost, simple solution for high quality photography and/or videography without the need to comply with the regulations associated with remotely piloted aircraft or drones and, further, are sufficiently lightweight to reasonably lift with small balloons, kites, kite-balloons, or lightweight poles.

Additionally, disclosed embodiments stabilize camera systems against violent motions which can be experienced with small balloons, kite-balloons, kites, or lightweight poles.

Additional aspects, advantages, features and objects of the disclosure will be made apparent from the drawings and the detailed description of the illustrative embodiments construed in conjunction with the appended claims that follow. It will be appreciated that described features are susceptible to being combined in various combinations without departing from the scope of the disclosure as defined by the appended claims.

Referring to FIGS. 1-4, an aerial photography and/or videography system 1 includes a gyroscopically stabilized camera support platform 200 carried by a kite-balloon 100. When formed from a lightweight film material and filled with a lightweight gas, balloon 110 provides additional buoyancy beyond its own weight. In an example, the balloon is constructed from two sheets of 0.8 m in diameter 0.001-inch-thick Mylar™ seamed and sealed into an enclosed volume of 0.075 m$^3$ and filled with helium. This construction supplies approximately 90 grams of gas lift in standard conditions. With the balloon weighing approximately 36 grams the net lift of the balloon is 54 grams.

It has been established that aerodynamic drag forces on an object are proportional to the frontal area the object presents and increase as the square of the wind velocity. As such, the aerodynamic drag of a balloon in the presence of any wind may quickly overcome the small, constant buoyancy lift provided by the balloon and both wind surges and vortex shedding from the balloon surfaces can cause the balloon to violently rotate and lunge. A kite 120 may be added to balloon 110 to stabilize rotation and lunging as well as maintain elevation with positive lift provided by symmetrical wing surfaces which present a nearly planar surface at some angle of attack to the incoming wind.

While kite 120 may take any of a variety of shapes suitable for stabilizing rotation, lunging and elevation, in an example, kite 120 takes a "delta" shape having a generally triangular footprint. A keel member 123 is located generally at the intersection of wings 125a and 125b between a nose or apex 121 of kite 120 and a midpoint 124 of the trailing edges. A central rod may attach keel member 123 to the intersection of wings 125a, 125b. Keel attachment point 122 provides for coupling link rod 300 to keel 123 for tethering to ground, as set forth in greater detail below.

Left and right wings 125a, 125b include leading edges with wing spars 126a, 126b. As the apparent wind experienced by a kite increases, purely rigid spars tend to maintain the same wing surface area which may cause instability and eventual structural failure. In an example, wing spars 126a, 126b are deformable so as to decrease wing surface area and angle of attack with increasing wind resistance. Spars 126a, 126b may be fabricated from any of a variety of semi-flexible lightweight materials including but not limited to fiberglass, carbon fiber and combinations of these.

The covered surfaces of wings 125a and 125b may be constructed of any of a variety of lightweight, durable materials including but not limited to a thin metalized foil. In an example, the mass of kite 120 is in the range of about 10-15 grams. While other kite surfaces may be taught under aerodynamic pressure, loosely fitting and/or loosely flapping trailing edge surfaces 127a, 127b create highly turbulent flow and provide increased drag aft of the mass centroid of the kite-balloon assembly 100 to provide stability in wind. For rotational stability, a center of pressure of kite 110, the point at which a resultant force of integrated pressure fields acts, may be arranged forward of a center of mass of kite-balloon assembly 100 or between the center of mass and nose 121. Increasing the distance between the center of mass and the center of pressure further increases rotational stability of kite-balloon 100.

Link rod 300 can be provided, for example, as a semi-rigid rod configured to flex in and out of a generally straight, elongate shape in response to forces at either end produced by the flying apparatus or the operator. This further counteracts undesirable instabilities. To avoid imaging of portions of kite-balloon 100, link rod 300 may be sufficiently long to distance support platform 200 from kite-balloon 100. For example, link rod 300 may be at least one meter long such that stabilized support platform 200 may be located a meter or more from kite-balloon 100.

Coupled to link rod 300, for example, by one or more swivel clips, is a cord 400 to further isolate camera support platform 200 from disturbances from ground operators and/or kite-balloon 100. Cord 400 may be any of a variety of lengths suitable for further isolating the camera from disturbances, for example, between one and many meters and may include elastic shock cord. Further, one or more additional swivel clips may couple cord 400 to a traditional tether flight line as found spooled on reels held by an operator for letting out or drawing in of the flight line, depending on the altitude and camera height required.

The point of attachment between kite 120 and balloon 110 may largely be determined by trial and error to maximize overall kite stability in actual conditions. Increasing the position of kite 120 forward relative to balloon 110 decreases the angle of attack of wings 125a, 125b and therefore the lift. Increasing the position of kite 120 aft or rearward relative to balloon 110 increases the angle of attack of wings 125a, 125b and therefore the lift and drag.

Figure 1:
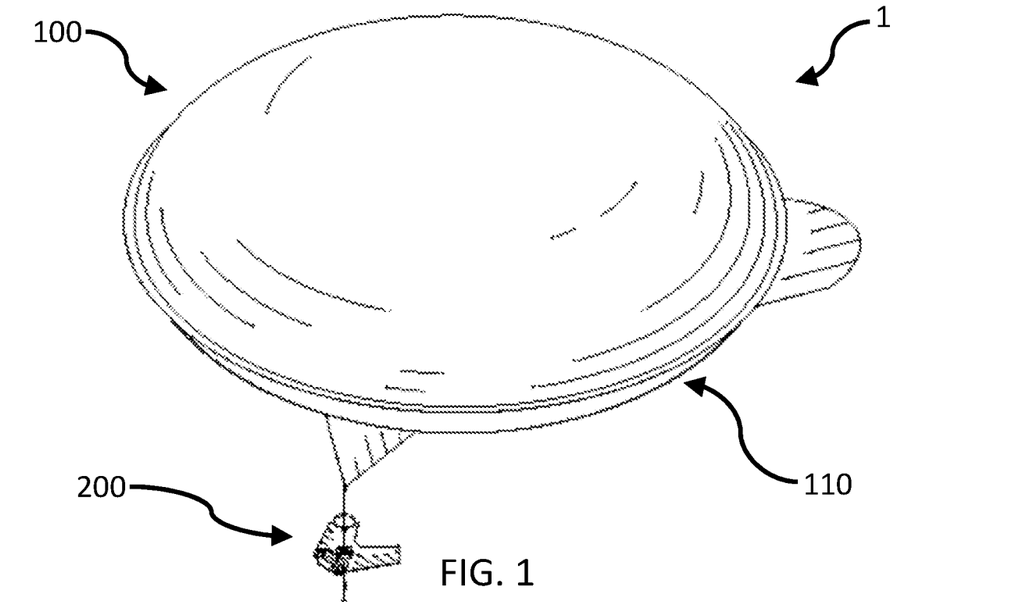
FIG. 1 illustrates a perspective view of a system for aerial photography or videography.
Figure 2:
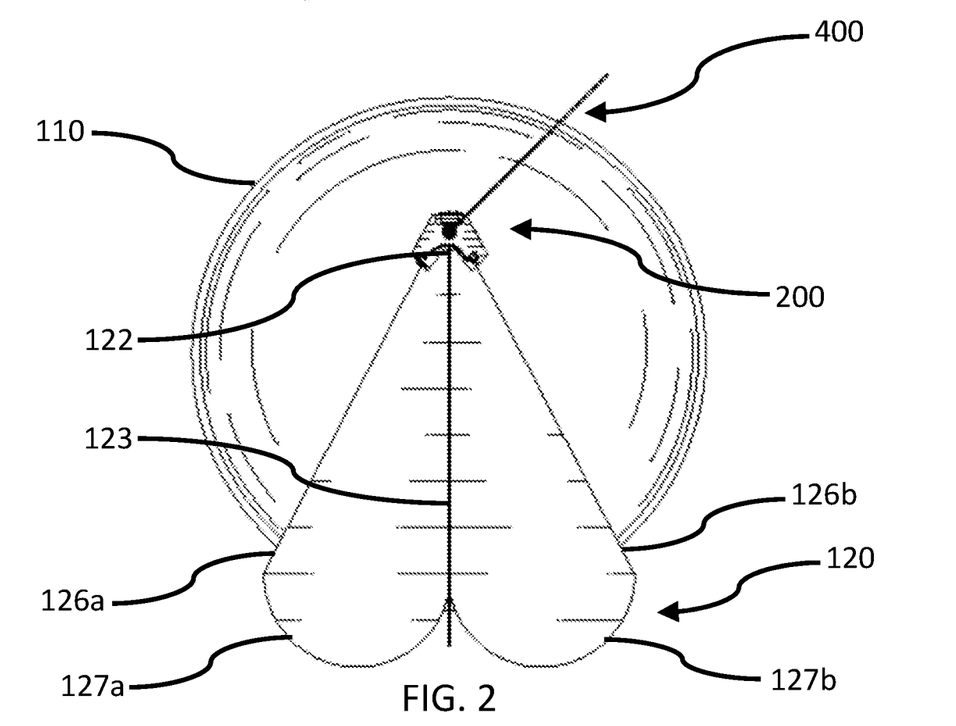
FIG. 2 illustrates a bottom view of the system of FIG. 1.
Figure 3:
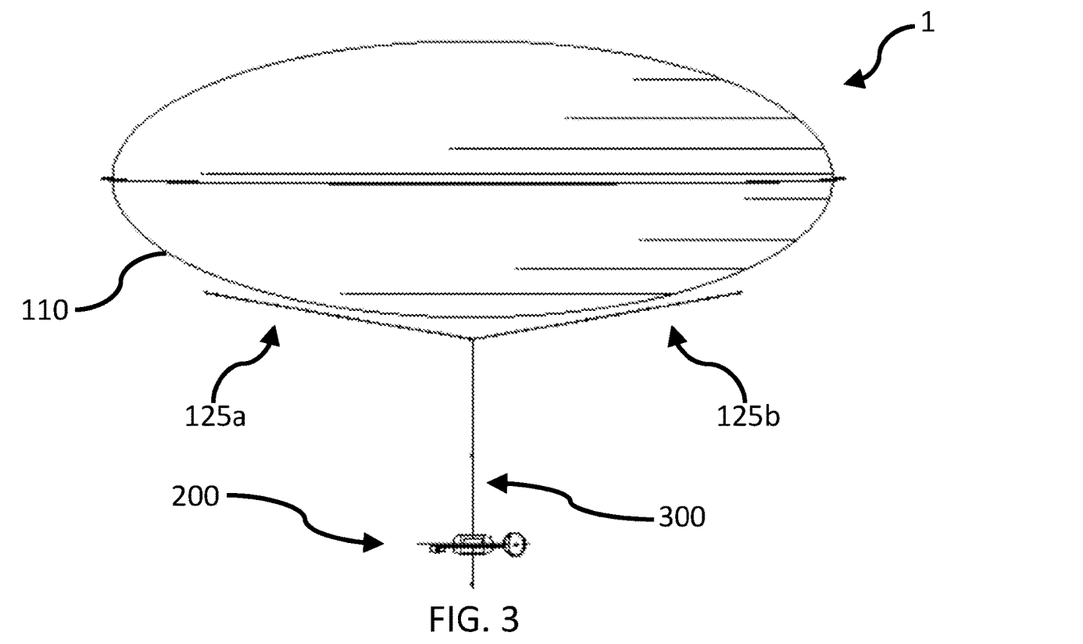
FIG. 3 illustrates a front view of the system of FIGS. 1 & 2.
Figure 4:
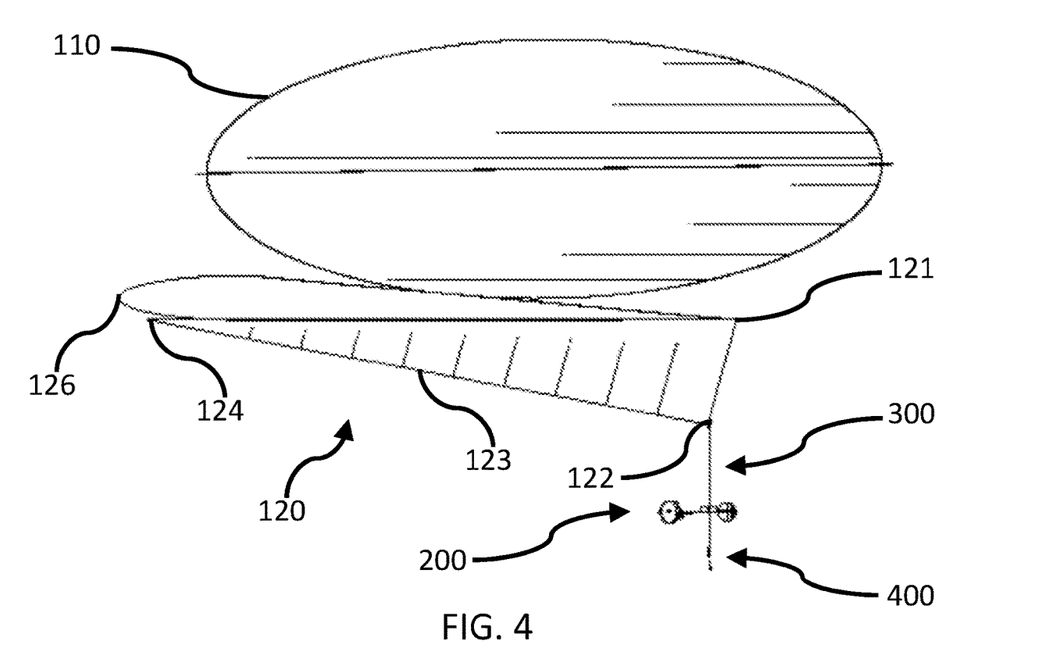
FIG. 4 illustrates a left side view of the system of FIGS. 1-3.
Figure 5:
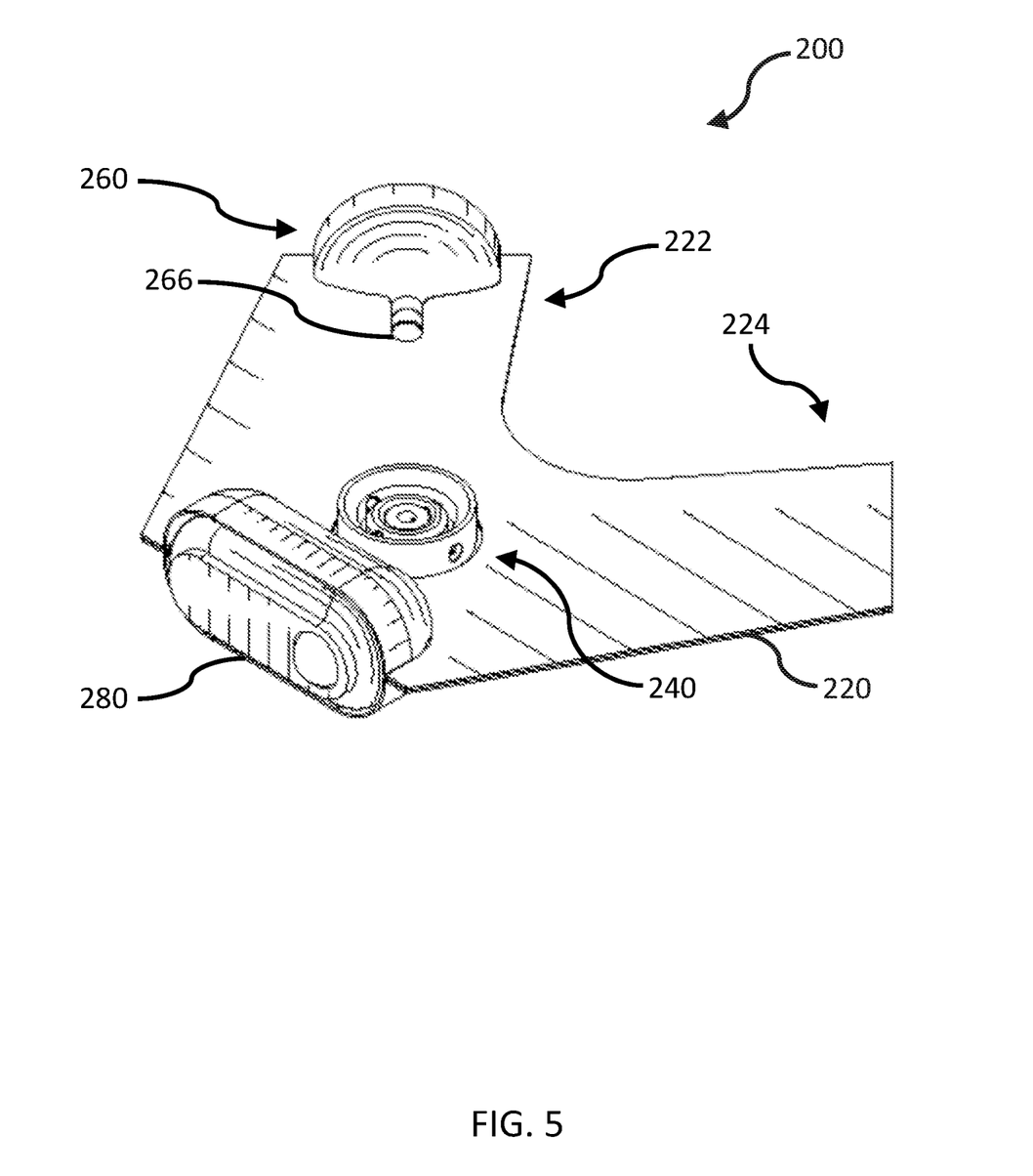
FIG. 5 illustrates a perspective view of a camera support platform.
Figure 6:
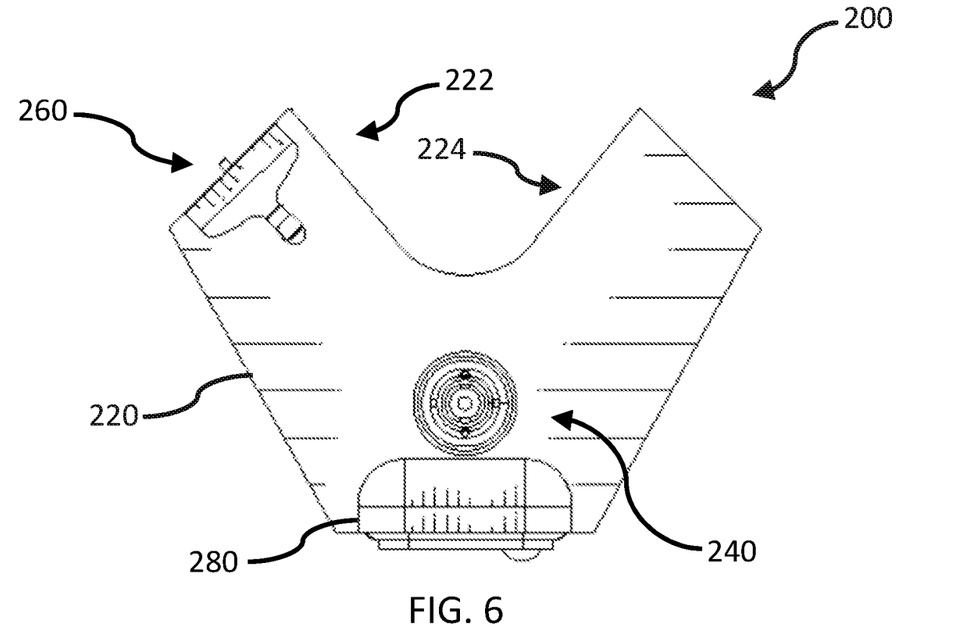
FIG. 6 illustrates a top view of the support platform of FIG. 5.
Figure 7:
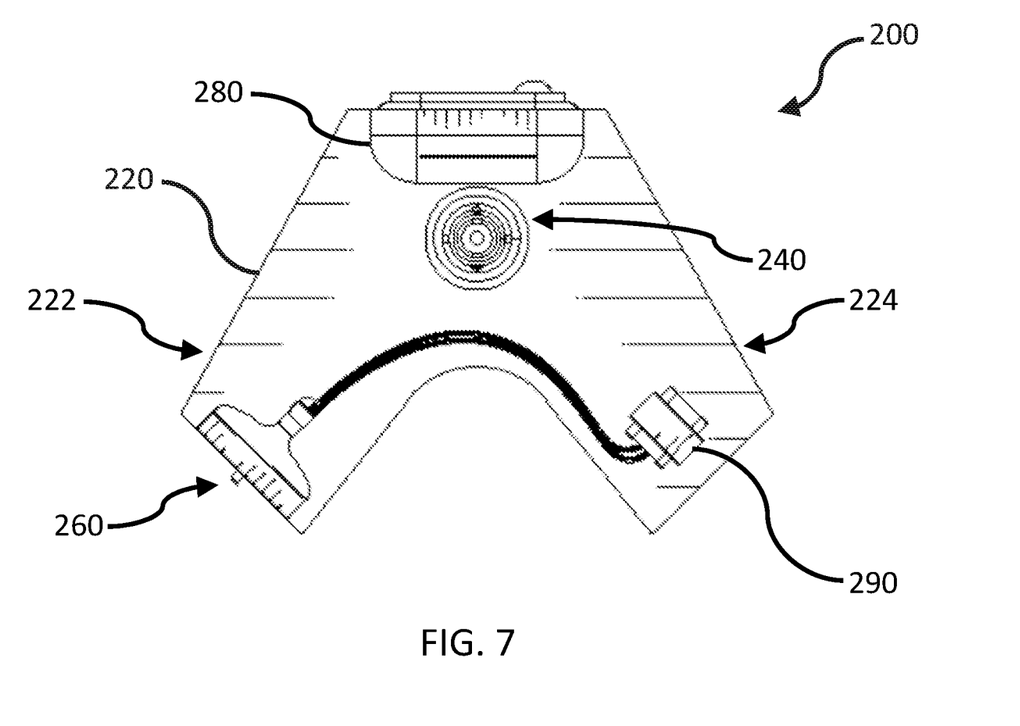
FIG. 7 illustrates a bottom view of the support platform of FIGS. 5 & 6.
Figure 8:
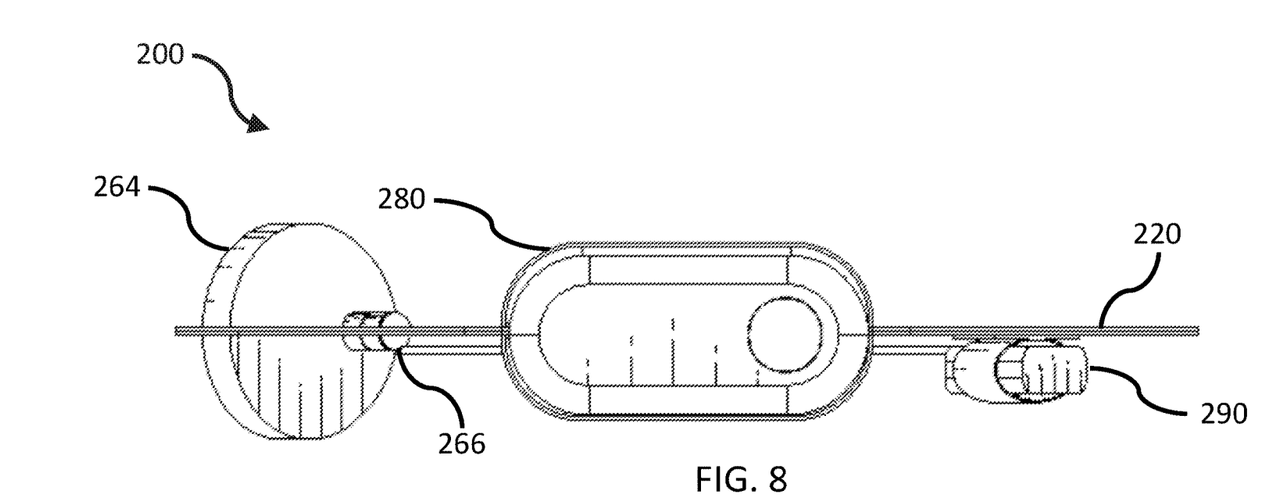
FIG. 8 illustrates a front view of the support platform of FIGS. 5-7.
Figure 9:
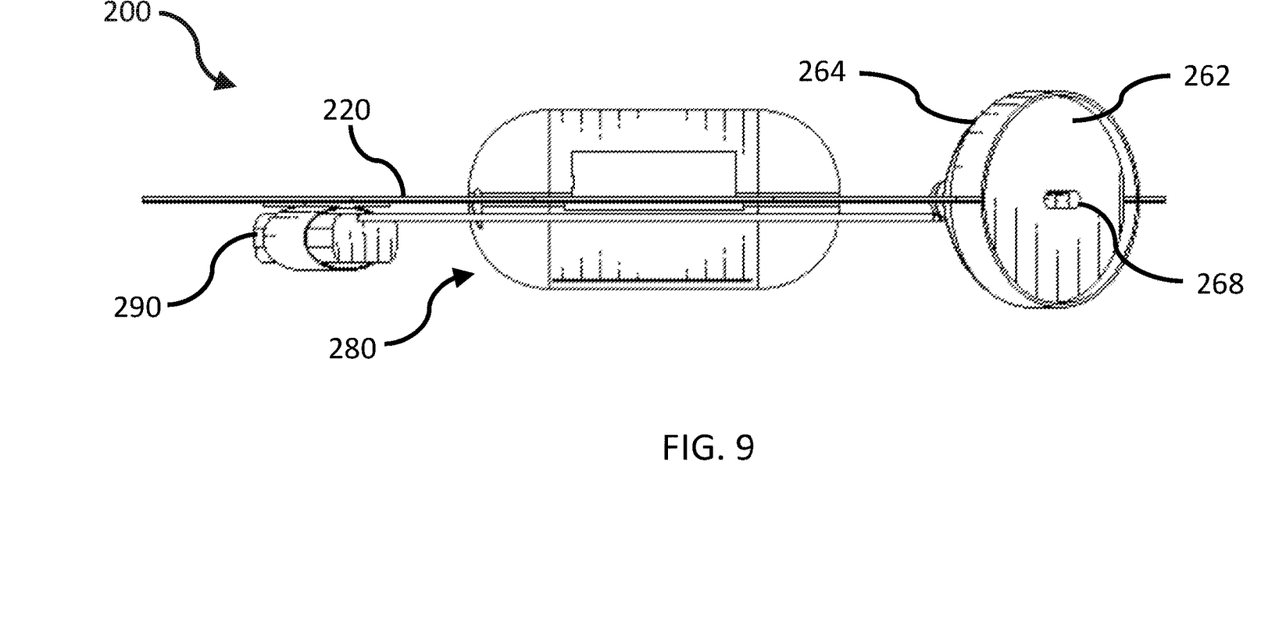
FIG. 9 illustrates a rear view of the support platform of FIGS. 5-8.
Figure 10:
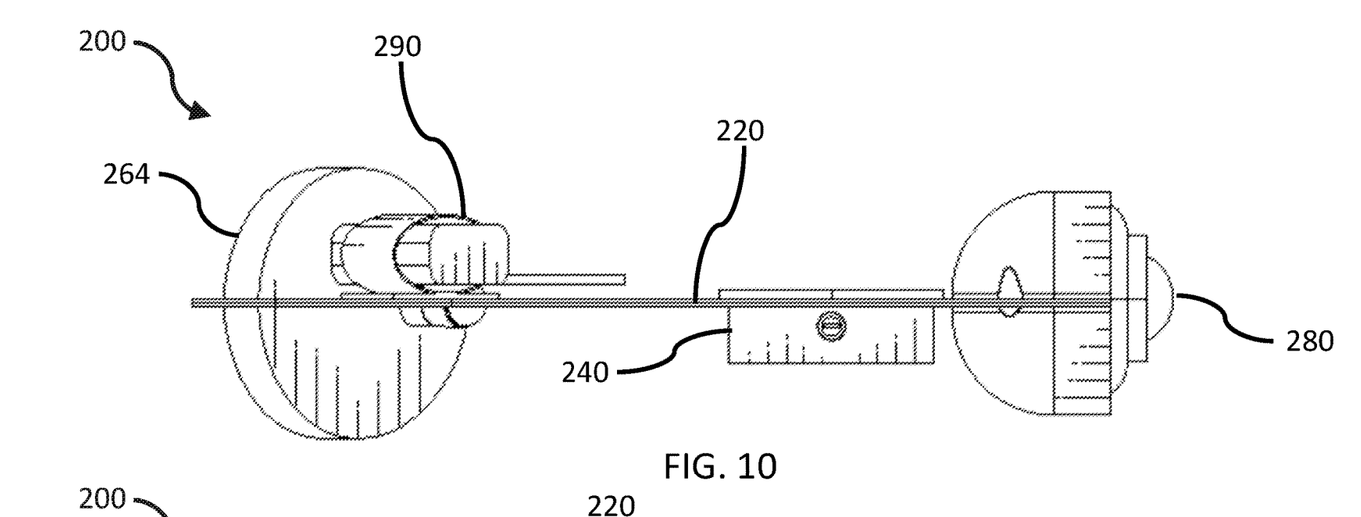
FIG. 10 illustrates left view of the support platform of FIGS. 5-9.
Figure 11:
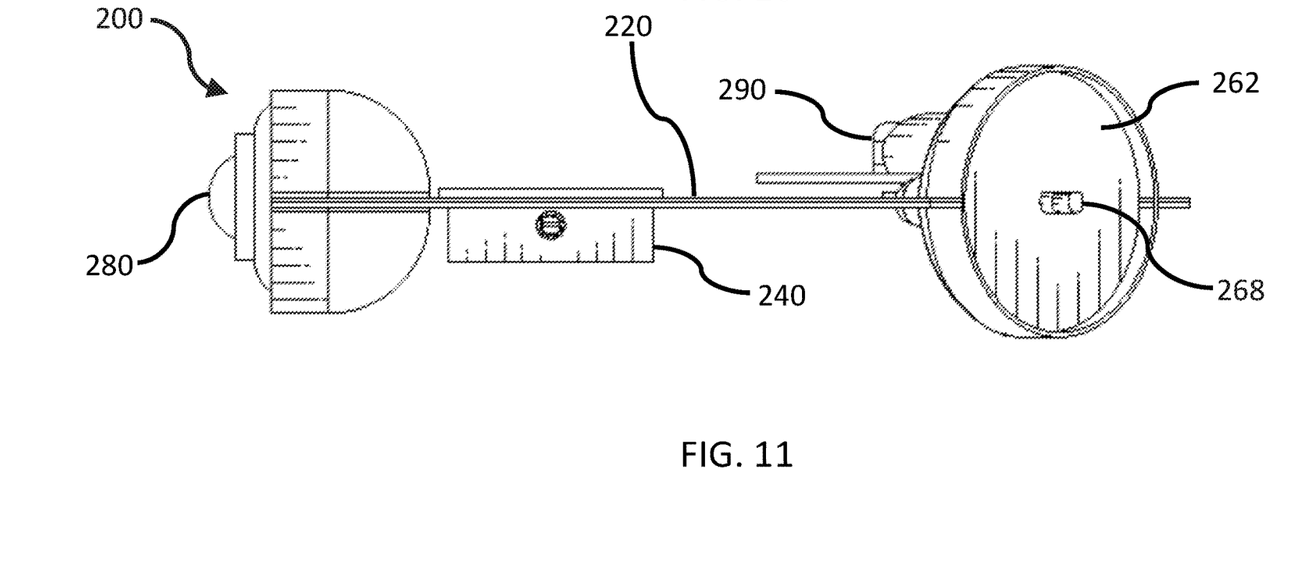
FIG. 11 illustrates right view of the support platform of FIGS. 5-10.

Referring now to FIGS. 5-11 for greater detail, gyroscopically stabilized camera support platform 200 is configured to rotationally pivot about link rod 300 attached at the end to kite balloon keel 123 (FIG. 4). Support platform 200 is provided for coupling a camera to kite-balloon 100 in the case that a camera may not reasonably be mounted to the exact center of pressure or center of mass without the relatively large mass of a camera causing a pendulum effect resulting in the inability of the system to remain stable. Support platform 200 takes advantage of a gyroscopically stabilized mechanical gimble 240 to isolate the airframe perturbations and minor instabilities from mounted camera 280. Mechanical gimble 240, as described in greater detail below, provides three axes of rotation, either fully or partially, between link rod 300 (excluded from FIGS. 5-13 for clarity) and camera mounting surface 220.

Camera mounting surface 220 may be provided in any of a variety of shapes suitable to enable balancing mounting surface 220 and components mounted thereon about the mass centroid of support platform 200. In an example, camera mounting surface 220 may be formed in a 'V' shape provided with two arms and three opposing poles. In a further example, mounting surface 220 may be a tripole surface. Mounting surface 220 may be provided to an outer ring of gimbal 240 such that link rod 300 penetrates the system centroid.

In an example, one of the camera support platform components may be mounted on one arm 222, another may be mounted on a second arm 224 and a third may be mounted at the base of the 'V', where the first and second arms 222 and 224 meet. In a further example, one of the camera support platform components may be mounted on arm 222 at a first pole of the tripole mounting surface, another may be mounted on arm 224 at a second pole of the tripole mounting surface about 120 degrees from the first pole and a third may be mounted where the first and second arms 222 and 224 meet at a third pole of the tripole mounting surface about 120 degrees from each of the first and second poles.

Camera mounting surface 220 may be of a generally planar structure and lightweight rigid material such as carbon composite, molded plastic, sheet stock plastic or sheet stock balsa wood. Rigidly affixed close in can be seen digitally stabilized camera 280. The mass center of camera 280 may be offset from the rotational axis of mechanical gimbal 240.

To prevent obstruction of the camera's field of view, even when all axes are locked at their maximum excursions or the platform fully rotates 360 degrees, the rigid point of attachment support platform 200 is on the innermost bearing, which is supported on and rotates about a link rod 300, and the mounting surface 220 is carried on the outermost bearing, such that the payload, including an onboard electronics module, a camera and one or more torque resisting flywheels, is carried fully outboard. Conventional three-axis gimbals are rigidly carried by an outer member, and the payload, such as a camera and one or more inertial flywheels, is carried innermost. Gimbal 240, shown by way of example in greater detail in FIGS. 12 & 13, includes an inner ring 242 external to and concentric with link rod 300 with which it is coupled for relative rotation about the link rod longitudinal axis or first axis. Dual miniature, nearly frictionless ball bearings are carried within the central bore of inner gimbal ring 242 may be co-axially fitted over link rod 300 which can be rigid, semi-rigid or completely flexible.

Figure 12:
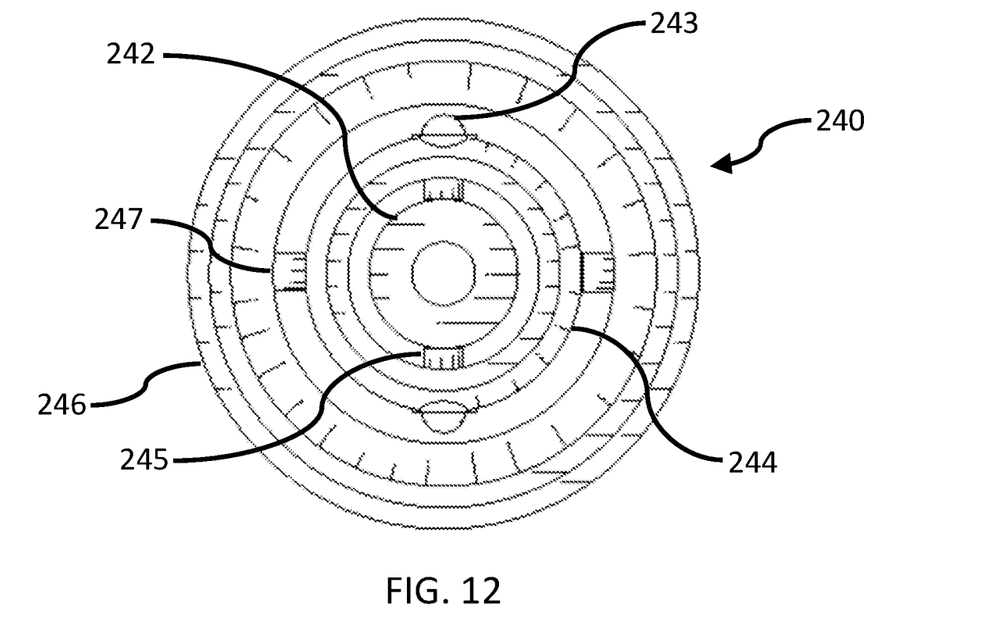
FIG. 12 illustrates top view of a gimbal suitable for use in association with disclosed systems.
Figure 13:
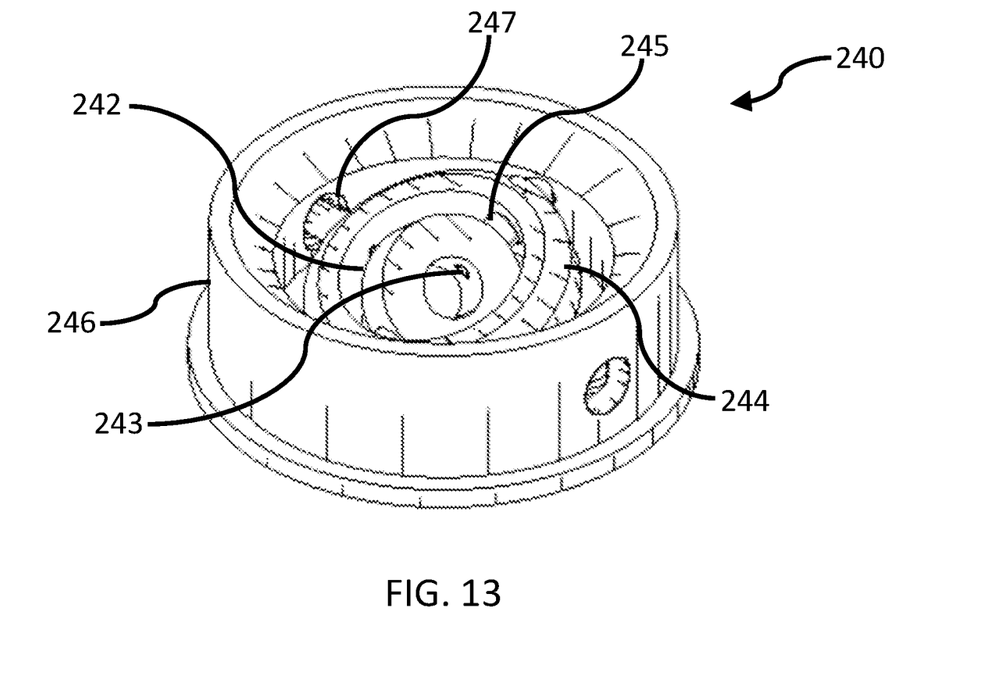
FIG. 13 illustrates perspective detail view of the gimbal of FIG. 12.

A middle ring 244 external to and concentric with the inner ring 242 is coupled thereto for relative pivoting about a second axis nearly perpendicular to the link rod longitudinal axis. The inner diameter of middle ring 244 may be substantially larger than the outer diameter of inner ring 242. Middle ring 244 is provided with bearing holding pockets which house miniature nearly frictionless ball bearings. In an example, the bearing holding pockets are positioned at two axially diametrically opposed locations. Miniature M1 screws 243 pass through the inner race bore of bearings and have spacer sleeves 245 fitted before the screws are landed into tapped M1 threads of inner gimbal ring 242.

An outer ring 246 external to and concentric with middle ring 244 is coupled thereto for relative pivoting about a third axis nearly perpendicular to the second axis and/or generally coplanar with the longitudinal axis of link rod 300. Mounting surface 220 is provided to outer ring 246. Without limiting relative locations of the outer ring of gimbal assembly 240 and camera mounting surface 220, camera mounting surface 220 may also be said to be supported by outer ring 246.

In a likewise fashion, outer ring 246 is provided with bearing holding pockets which house miniature nearly frictionless ball bearings. In an example, the bearing holding pockets are positioned at two axially diametrically opposed locations. Miniature M1 screws pass through the inner race bore of bearings and have spacer sleeves 247 fitted before the screws are landed into tapped M1 threads of middle gimbal ring 244. The closer the three gimbal axes are to being mutually perpendicular and the closer the three rings are to being concentric, the less the mass centroid of camera support platform 200 will move with respect to a fixed point on link rod 300, and the more balanced the system will be. While gimbal axes may not be exactly mutually perpendicular due to, for example, manufacturing limitations, they will generally be within 1-2 degrees of perpendicular. In an example, outer gimble ring 246 has an outside diameter of 12 mm, with the entire mass of gimble assembly being less than 1 gram.

A rotating mass, such as a flywheel 262, can be used to further stabilize support platform 200 since a rotating mass imparts an angular momentum that resists any change in direction of the axis of rotation of the mass with a resisting torque, τ. For a flywheel:

$$\tau = L^* w_p = I^* \omega^* \omega_p = (m^* r^2/2)^* \omega^* \omega_p$$

Where m is the mass, r is the outside radius of the planar flywheel disk, $\omega$ is the rotational velocity in radians per second and $w_p$ is the precession rate in radians per second. Thus, a resisting torque can be calculated based on the properties of the flywheel.

A flywheel assembly 260 includes flywheel 262, a motor 266 configured to rotate flywheel 260 on shaft 268. In an example, flywheel 262 is a 2 mm thick brass disk with a 25 mm diameter having a mass of about 2.5 grams given an angular velocity of about 1.8E3 radians/sec, or 250 rotations per second. Flywheel 262 may be machined with a recessed inner cutout allowing for attachment of small test and balance masses during the process of dynamic balancing. Flywheel assembly 260 may be provided to mounting surface 220 with shaft 268 oriented at an angle of 45 degrees with respect to each of the second and third axes of gimbal assembly 240 such that the angular momentum of flywheel assembly 260 is divided equally therebetween.

In an example, a motor 266 provided to rotate flywheel 260 is a small dc motor, often used to provide vibration to mobile devices. This type of motor weighs less than 1 gram and consumes 85-90 mA of current when operated at 3.7 DC. Shaft 268 of motor 266 is received in a matching hole in flywheel 262, before balancing. A shroud 264 may be provided to surround and protect the flywheel 262 in the event of a crash or mishandling and may be formed from any of a variety of lightweight materials including but not limited to plastic or carbon fiber or a combination of these.

Camera 280 may be implemented in any of a variety of forms enabling videography and/or still photography. Suitable cameras may be implemented to use internally employed optical stabilization to shift one or more optical components under the control of an internal digital inertial measurement unit (IMU) controller from frame to frame. Suitable alternatives to optical stabilization use digital frame stabilization to image from a larger sensor size (in X and Y pixels) than is presented to the user to allow the pixels from frame to frame to be translated or rotated in order to present a smoothing video effect.

An onboard electronics module 290 is mounted at a position on mounting surface 220 so as to balance with first flywheel 262 and camera 280 and is configured to control and power motor 266 operatively coupled with flywheel 262. The onboard electronics module may be configured to control and power the motor in accordance with sensed conditions of the system and/or in the system environment. Onboard electronics module 290 may take any of a variety of forms suitable for controlling components of the system including but not limited to a microcontroller, a field programmable gate array or combinations of these and includes or is otherwise coupled with a power source such as a battery. In an example, the battery is a Lithium-Ion battery. In an example, onboard electronics module 290 is mounted in lieu of separate balancing weights and can be mounted anywhere its mass balances with the rest of the system using repositionable tape or slide mounting. In another example, control logic may be excluded from onboard electronics module 290 leaving the power source and associated connecting wires and/or harnesses.

The locations of all the masses of components 240, 260, 290, and 280 are computed so as to allow a horizontal balance of camera support platform 200. For example, camera 280 is mounted at a first position on the support platform, first flywheel 262 is mounted at a second position on support platform 200 and onboard electronics module 290 is mounted at a third position on support platform 200.

The centroid of support platform 200 may be arranged below the first and second pivot axes of mechanical gimbal 240 or at the center of the gimbal. With the center of mass of camera support platform 200 at or above pivot axes of mechanical gimbal 240, support platform 200 may never find gravitational equilibrium and will be unstable. With the center of mass of camera support platform 200 too far below pivot axes of mechanical gimbal 240, the system may pendulum and overpower the angular momentum of gyroscopic flywheel 262.

While a single flywheel has been described and shown, in some examples, multiple flywheels may be provided. In an example, two flywheels may be provided oriented along mutually perpendicular axes. In a further example, one flywheel may be oriented along each of the second and third axes of gimbal assembly 240. In another example, each flywheel may be mounted at oblique angles to the second and third axes of gimbal assembly 240. Regardless of the particular orientations of flywheels, additional flywheels may be mounted on camera mounting surface 220 in balance with the first flywheel and other components of support platform 200.

Figure 14:
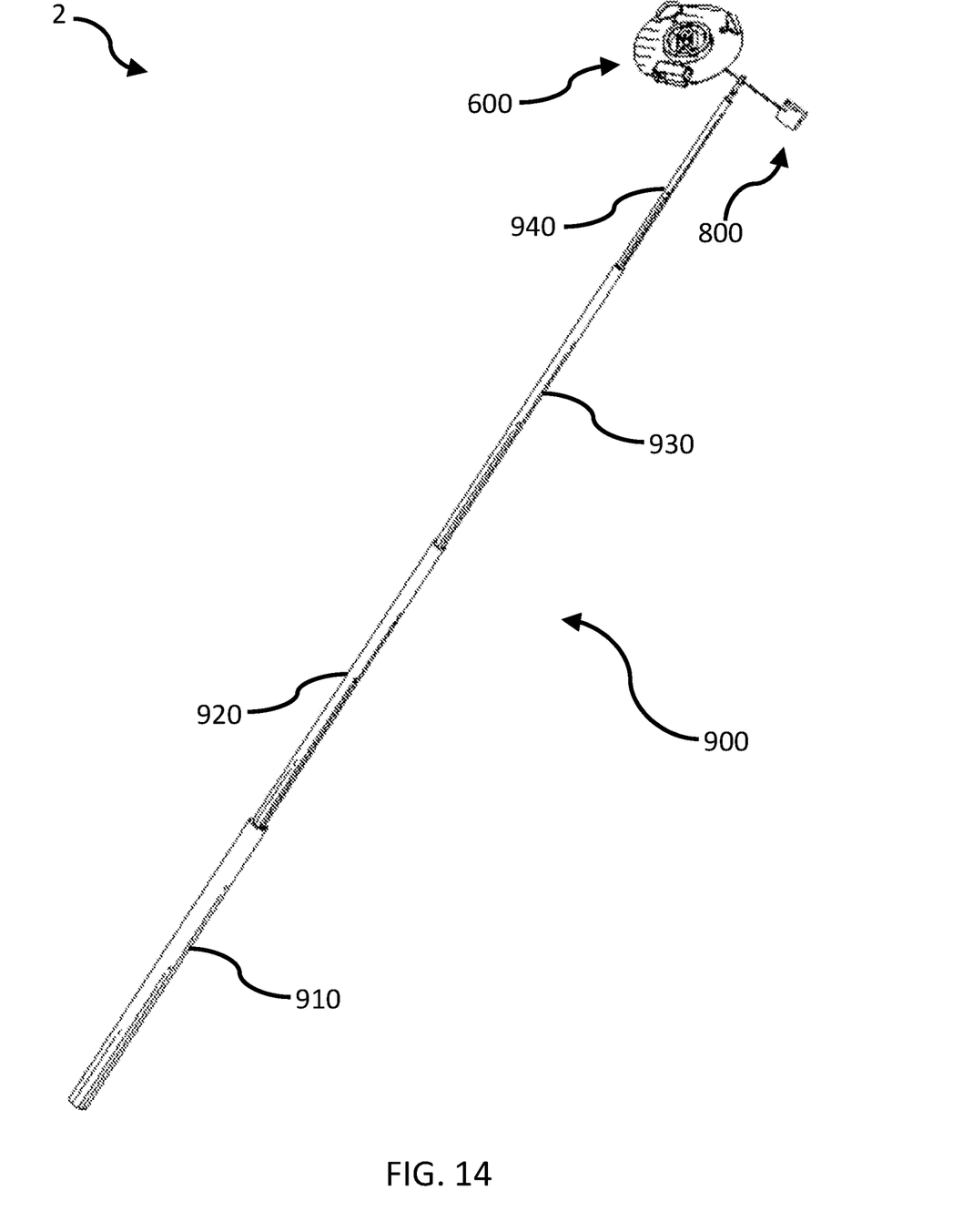
FIG. 14 illustrates a perspective view of a pole-mounted system for aerial photography or videography.
Figure 15:
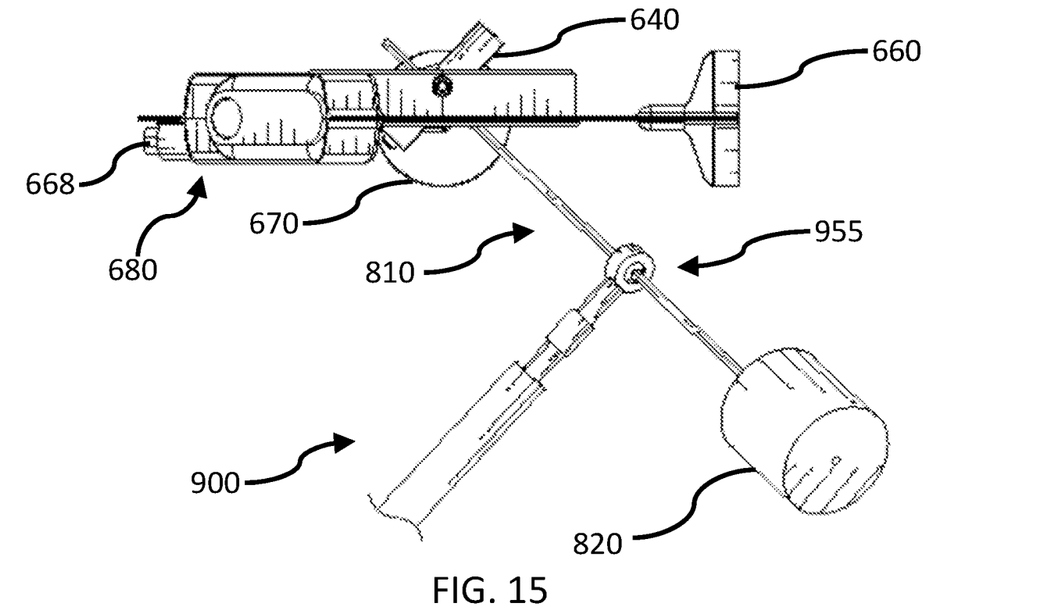
FIG. 15 illustrates a side view of the system of FIG. 14.
Figure 16:
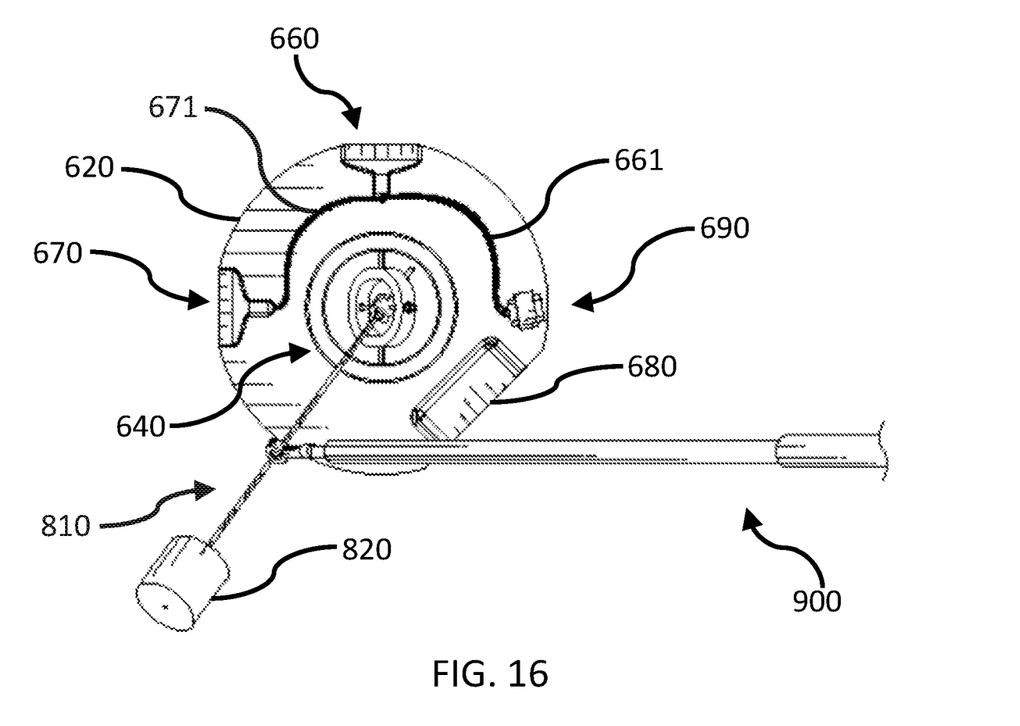
FIG. 16 illustrates a bottom view of the system of FIGS. 14 & 15.

Mounting a camera platform to a pole allows holding the platform at any angle from vertical to horizontal and below. As an alternative to or in addition to a system including a flying craft such as kite-balloon 100, the system may include a telescoping pole 900 rotatably coupled with a link rod 810 held by a camera support platform 600.

Referring to FIGS. 14-16, an aerial photography and/or videography system 2 includes a suitable pole 900 having several telescoping segments 910, 920, 930 and 940 enabling collapse for transport and variable length extension to achieve any of a variety of lengths of between about 5 and about 10 meters according to the desired camera position and/or angle. In an example, pole 900 has a mass less than a kilogram.

Telescoping pole 900 may be coupled with link rod 810 by a ball swivel component 955 configured for rotating about a longitudinal axis of telescoping rod 900. Link rod 810 may be rigid. It is held vertically upright and captive by ball swivel component 955 but allowed full rotational freedom of motion and angular displacement about the ball swivel center. A counterweight 820 coupled with link rod 300 distal from support platform 600 resists deviation of link rod 810 from a vertical orientation. For example, counterweight 820 may be mounted near the end of link rod 810. A rotational bearing may be provided between the distal most segment and the ball swivel component to decouple any pole rotations caused by the ground operator from support platform 600 and may include one or more miniature nearly frictionless ball bearings. Similarly, elements of camera support platform 600 attached to ball swivel 955, by virtue of their inertia, are free to swing and pivot which further isolates support platform 600 from pole-induced forces.

As with gimbal 240 to link rod 300 above, mechanical gimbal 640 provides 3-degrees of rotation between link rod 810 and camera mounting surface 620. Gimbal 640 is generally similar to gimbal 240 with some possible exceptions. Mounting components on a pole enables supporting higher weights. Gimbal assembly 640 can be substantially larger than in flying craft variants. Shaft spacers between concentric rings may be longer and the middle and outer rings may be larger than with systems employing flying craft to accommodate possible large angles experienced by link rod 810 when operated as mounted to the pole 900.

Provided to an outer gimbal ring of gimbal assembly 640, is a camera mounting surface 620 which may take any of a variety of shapes including but not limited to circular. Without limiting relative locations of the outer ring of gimbal assembly 640 and camera mounting surface 620, camera mounting surface 620 may be said to be supported by the outer ring. Camera mounting surface 620 may be any of a variety of lightweight, rigid, planar structures. For example, a disk may be formed from carbon composite, molded plastic, sheet stock balsa wood, sheet stock plastic or combinations of these. A digitally stabilized camera 680 may be rigidly affixed to mounting surface 620.

Two motor-driven flywheel assemblies, 660 and 670 may be provided to mounting surface 620. Referring to FIG. 16, axes of flywheel assemblies 660, 670 may be aligned with the pivot axes of gimbal assembly 640. Since providing components on a pole enables supporting higher weights, the mass of each flywheel can be greater than in flying vehicle variants. In an example, the mass of each flywheel is 15 grams or more.

An onboard electronics module 690 is mounted at a position on mounting surface 620 so as to balance about the center of gimbal 640 with flywheel assemblies 660 and 670 and camera 680. Onboard electronics module 690 may be used to moveably counterweight other components. In an example, onboard electronics module 690 is mounted in lieu of separate balancing weights and can be mounted anywhere its weight balances with the rest of the system using repositionable tape or slide mounting.

Configured to control and power motors of the flywheels of assemblies 660 and 670 in accordance with sensed conditions of the system and/or of the system environment, onboard electronics module 690, may take any of a variety of forms suitable for controlling components of the system including but not limited to a microcontroller, a field programmable gate array or combinations of these and includes or is otherwise coupled with a power source such as a battery. In an example, control logic may be excluded from onboard electronics module 690 leaving the power source and associated connecting wires and/or harnesses. The battery may be of a variety of lithium-ion battery and generally sufficient to run motors of the flywheel assemblies 660, 670 for over an hour and may be rated at 220 mAH, for example. Motor wire pairs 661 and 671 may be wired either in series or parallel with a battery connecter and a battery wire.

In an example use process, a user provides a camera support platform having a camera, a three-axis gimbal, one or more flywheels and an onboard electronic module and couples an internal ring of the gimbal with a link rod attached to a kite-balloon. A cord may then be attached to the ink rod with one or more swivel clips. With a tether attached to the cord, the user controls the position and/or elevation of the kite-balloon and the camera support platform. The camera is remotely operated by the user to capture still photos or video from the desired position and/or elevation. During photo and/or video capture, internal modules of the camera stabilize the camera optically and/or digitally while flywheels, the three-axis gimbal, the link rod and the cord isolate the camera from disturbances and/or mechanically stabilize the camera.

In another example use process, a user provides a camera support platform having a camera, a three-axis gimbal, one or more flywheels and an onboard electronic module and couples an internal ring of the gimbal with a link rod gripped by a ball swivel at the end of a telescoping pole. With the telescoping pole, the user controls the position and/or elevation of the kite-balloon and the camera support platform. The camera is remotely operated by the user to capture still photos or video from the desired position and/or elevation. During photo and/or video capture, internal modules of the camera stabilize the camera optically and/or digitally while flywheels, the three-axis gimbal, the link rod and the cord isolate the camera from disturbances and/or mechanically stabilize the camera.

In yet another example, a user provides a camera support platform having a three-axis gimbal, one or more flywheels and an onboard electronic module and couples a camera to the support platform, for example, to a mounting surface of the platform.

Embodiments of the disclosure are susceptible to being used for various purposes, including, though not limited to, enabling users to obtain high quality photos and/or videos with simple, inexpensive systems.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A system for aerial photography or videography, comprising:
    a link rod having a longitudinal axis;
    a gimbal including:
        an inner ring external to and concentric with the link rod and coupled thereto for relative rotation about the link rod longitudinal axis;
        a middle ring external to and concentric with the inner ring and coupled thereto for relative pivoting about a second axis nearly perpendicular to the link rod longitudinal axis; and
        an outer ring external to and concentric with the middle ring and coupled thereto for relative pivoting about a third axis nearly perpendicular to the second axis;
    a platform provided to the outer ring;
    a camera mounted at a first position on the platform;
    a first flywheel mounted at a second position on the platform in balance with the camera at the first position;
    a power source mounted at a third position on the platform in balance with the camera at the first position and the first flywheel at the second position; and
    a balloon coupled with the link rod through a kite provided to a bottom of the balloon.

2. The system as set forth in claim 1, wherein two of the first, second and third positions on the platform are located on first and second arms of the platform.

3. The system as set forth in claim 1, further comprising a motor configured to spin the flywheel in accordance with instructions from an onboard electronics module.

4. The system as set forth in claim 1, further comprising a telescoping pole rotatably coupled with the link rod.

5. The system as set forth in claim 1, further comprising a second flywheel mounted on the platform in balance with the first flywheel, the camera and the power source.

6. The system as set forth in claim 1, further wherein the second flywheel is mounted on the platform with its axis directed about perpendicular to the axis of the first flywheel.

7. The system as set forth in claim 1, wherein the kite further comprises trailing edges configured to create highly turbulent flow and provide increased drag aft of the system centroid.

8. The system as set forth in claim 1, wherein the kite further comprises deformable wing spars configured to decrease wing surface area and angle of attack with increasing wind resistance.

9. A system for supporting a camera during aerial photography or videography, comprising:
    a link rod having a longitudinal axis;
    a gimbal including:
        an inner ring external to and concentric with the link rod and coupled thereto for relative rotation about the link rod longitudinal axis;
        a middle ring external to and concentric with the inner ring and coupled thereto for relative pivoting about a second axis nearly perpendicular to the link rod longitudinal axis; and
        an outer ring external to and concentric with the middle ring and coupled thereto for relative pivoting about a third axis perpendicular to the second axis;
    a platform provided to the outer ring;
    a first flywheel mounted at a first position on the platform so as to balance with a camera at a second position on the platform
    an onboard electronics module mounted at a third position on the platform so as to balance with a camera at the first position and the first flywheel at the second position and being configured to control a motor operatively coupled with the first flywheel; and
    a balloon coupled with the link rod through a kite provided to a bottom of the balloon.

10. The system as set forth in claim 9, wherein two of the first, second and third positions on the platform are located on first and second arms of the platform.

11. The system as set forth in claim 9, wherein the onboard electronics module is configured to control the motor in accordance with sensed conditions on the system and/or in the system environment.

12. The system as set forth in claim 9, further comprising a telescoping pole rotatably coupled with the link rod.

13. The system as set forth in claim 9, further comprising a second flywheel mounted on the platform in balance with the first flywheel, a camera at the first position and the onboard electronics module.

14. The system as set forth in claim 9, wherein the second flywheel is mounted on the platform with its axis directed nearly perpendicular to the axis of the first flywheel.

15. The system as set forth in claim 9, wherein the kite further comprises trailing edges configured to create highly turbulent flow and provide increased drag aft of the system centroid.

16. The system as set forth in claim 9, wherein the kite further comprises deformable wing spars configured to decrease wing surface area and angle of attack with increasing wind resistance.

* * * * *